(12) United States Patent
Leiba et al.

(10) Patent No.: US 10,055,435 B2
(45) Date of Patent: Aug. 21, 2018

(54) INTERACTIVE PRESENTATION OF LARGE SCALE GRAPHS

(71) Applicant: International Business Machines Corporation, Armonk, NY (US)

(72) Inventors: Lior Leiba, Haifa (IL); Roy Levin, Zihron Yakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/145,830

(22) Filed: May 4, 2016

(65) Prior Publication Data

US 2017/0323463 A1    Nov. 9, 2017

(51) Int. Cl.

| G06F 17/30 | (2006.01) |
|---|---|
| G06F 3/0485 | (2013.01) |
| G06F 3/0484 | (2013.01) |
| G06T 11/20 | (2006.01) |
| G06F 3/0481 | (2013.01) |

(52) U.S. Cl.
CPC ...... *G06F 17/30312* (2013.01); *G06F 3/0485* (2013.01); *G06F 3/04815* (2013.01); *G06F 3/04845* (2013.01); *G06F 17/30958* (2013.01); *G06T 11/206* (2013.01); *G06F 2203/04806* (2013.01)

(58) Field of Classification Search
CPC .... G06T 11/20; G06F 3/04845; G06F 3/0485; G06F 17/30312; G06F 17/30958; G06F 2203/04806
See application file for complete search history.

(56) References Cited

U.S. PATENT DOCUMENTS

| 8,823,709 | B2 | 9/2014 | Grandhi et al. |
| 9,652,876 | B1 * | 5/2017 | Austern ............... G06T 11/206 |
| 2014/0343966 | A1 * | 11/2014 | Miyoshi ............... G06Q 40/08 |
| | | | 705/3 |
| 2015/0089422 | A1 | 3/2015 | Spaulding et al. |
| 2015/0186427 | A1 * | 7/2015 | Logothetis ........ G06F 17/30958 |
| | | | 707/776 |

(Continued)

OTHER PUBLICATIONS

Mao Lin Huang and Quang Vinh Nguyen., "A Space Efficient Clustered Visualization of Large Graphs", Fourth International Conference on Image and Graphics, 2007, Can be found at: http://ieeexplore.ieee.org/xpl/abstractKeywords.jsp?arnumber=4297211.

*Primary Examiner* — Xiao Wi
*Assistant Examiner* — Chong Wu
(74) *Attorney, Agent, or Firm* — Daniel Kligler

(57) ABSTRACT

A method, including storing, by a cluster including multiple server computers, a graph including vertices and edges distributed among the server computers, each of the server computers having a respective storage capacity within a range of storage capacities between a first storage capacity and a second storage capacity greater than the first storage capacity, the graph having a size greater than the second storage capacity. A vertex value indicating a set of virtual coordinates is computed for each of the vertices, and the respective set of virtual coordinates for each of the vertices are stored to a database. Upon receiving, from a host computer, a request indicating a subset of the vertices, respective sets of virtual coordinates for the requested subset of the vertices are retrieved from the database, and the retrieved sets of virtual coordinates are conveyed, to the host computer.

22 Claims, 3 Drawing Sheets

(56) References Cited

U.S. PATENT DOCUMENTS

2015/0347628 A1* 12/2015 Krajec ................. G06F 3/0482
  707/756
2016/0343005 A1* 11/2016 Liu ................... G06Q 30/0201

* cited by examiner

INTERACTIVE PRESENTATION OF LARGE SCALE GRAPHS

FIELD OF THE INVENTION

The present invention relates generally to graph processing, and specifically to a graph processing framework that can interactively present a subset of a large scale graph.

BACKGROUND

In graph theory, a graph is a representation of a set of objects where some pairs of objects are connected by links. The interconnected objects are represented by mathematical abstractions called vertices, and links that connect some pairs of vertices are called edges. Graphs can be depicted in diagrammatic form as a set of dots for the vertices, joined by lines or curves for the edges.

The description above is presented as a general overview of related art in this field and should not be construed as an admission that any of the information it contains constitutes prior art against the present patent application.

SUMMARY

There is provided, in accordance with an embodiment of the present invention a method, including storing, by a cluster including multiple server computers, a graph including vertices and edges distributed among the server computers, each of the server computers having a respective storage capacity within a range of storage capacities between a first storage capacity and a second storage capacity greater than the first storage capacity, the graph having a size greater than the second storage capacity, computing, for each of the vertices, a vertex value indicating a set of virtual coordinates, storing, to a database, the respective set of virtual coordinates for each of the vertices, receiving, from a host computer, a request indicating a subset of the vertices, retrieving, from the database, respective sets of virtual coordinates for the requested subset of the vertices, and conveying, to the host computer, the retrieved sets of virtual coordinates.

There is also provided, in accordance with an embodiment of the present invention a computing facility, including a host computer having a display, and a cluster including multiple server computers having a respective storage capacity within a range of storage capacities between a first storage capacity and a second storage capacity greater than the first storage capacity and configured to store a graph including vertices and edges distributed among the server computers, the graph having a size greater than the second storage capacity, to compute, for each of the vertices, a vertex value indicating a set of virtual coordinates, to store, to a database, the respective set of virtual coordinates for each of the vertices, to receive, from a host computer, a request indicating a subset of the vertices, to retrieve, from the database, respective sets of virtual coordinates for the requested subset of the vertices, and to convey, to the host computer, the retrieved sets of virtual coordinates.

There is further provided, in accordance with an embodiment of the present invention a computer program product, the computer program product including a non-transitory computer readable storage medium having computer readable program code embodied therewith, the computer readable program code including computer readable program code configured to store, on a cluster including multiple server computers, a graph including vertices and edges distributed among the server computers, each of the server computers having a respective storage capacity within a range of storage capacities between a first storage capacity and a second storage capacity greater than the first storage capacity, the graph having a size greater than the second storage capacity, computer readable program code configured to compute, for each of the vertices, a vertex value indicating a set of virtual coordinates, computer readable program code configured to store, to a database, the respective set of virtual coordinates for each of the vertices, computer readable program code configured to receive, from a host computer, a request indicating a subset of the vertices, computer readable program code configured to retrieve, from the database, respective sets of virtual coordinates for the requested subset of the vertices, and computer readable program code configured to convey, to the host computer, the retrieved sets of virtual coordinates.

BRIEF DESCRIPTION OF THE DRAWINGS

The disclosure is herein described, by way of example only, with reference to the accompanying drawings, wherein.

DETAILED DESCRIPTION OF EMBODIMENTS

Common uses of large scale graphs include storing web addresses that can be ranked by search engines, and storing user information and user posts that can be indexed by social media platforms. Since these large scale graphs may comprise billions of data rich vertices, they are usually stored on a cluster of multiple servers, since their size is typically greater than the storage capacity of any single server.

Embodiments of the present invention provide methods and systems for enabling a user to view a subset of a large scale graph. As described hereinbelow, a cluster comprising multiple server computers stores a first graph (also referred to herein as a large scale graph) comprising a set of vertices distributed among the server computers, each of the server computers having a respective storage capacity within a range of storage capacities between a first storage capacity and a second storage capacity greater than the first storage capacity, wherein the graph has a size greater than the second storage capacity. A vertex value indicating a set of virtual coordinates is computed for each of the vertices, and the respective sets of virtual coordinates for each of the vertices is stored to a database.

Upon receiving, from a host computer, a request indicating a subset of the vertices, respective sets of virtual coordinates for the requested subset of the vertices are retrieved from the database, and conveyed to the host computer. The host computer can then generate a second graph (also referred to herein as a computed graph) comprising the subset of the vertices and additional edges that connect pairs of the vertices in the subset, and present the second graph on a display.

By presenting a subset of the vertices of a large scale graph, systems implementing embodiments of the present invention avoid flooding a user with too much data (e.g., displaying billions of vertices & edges on the user's display). Additionally, upon presenting the requested range of vertices, systems implementing embodiments of the present invention can provide software tools that enable the user to perform operations such as zooming in/out and scrolling (i.e., panning up/down/left/right) in order to view other or additional vertices in the graph.

Figure 1:
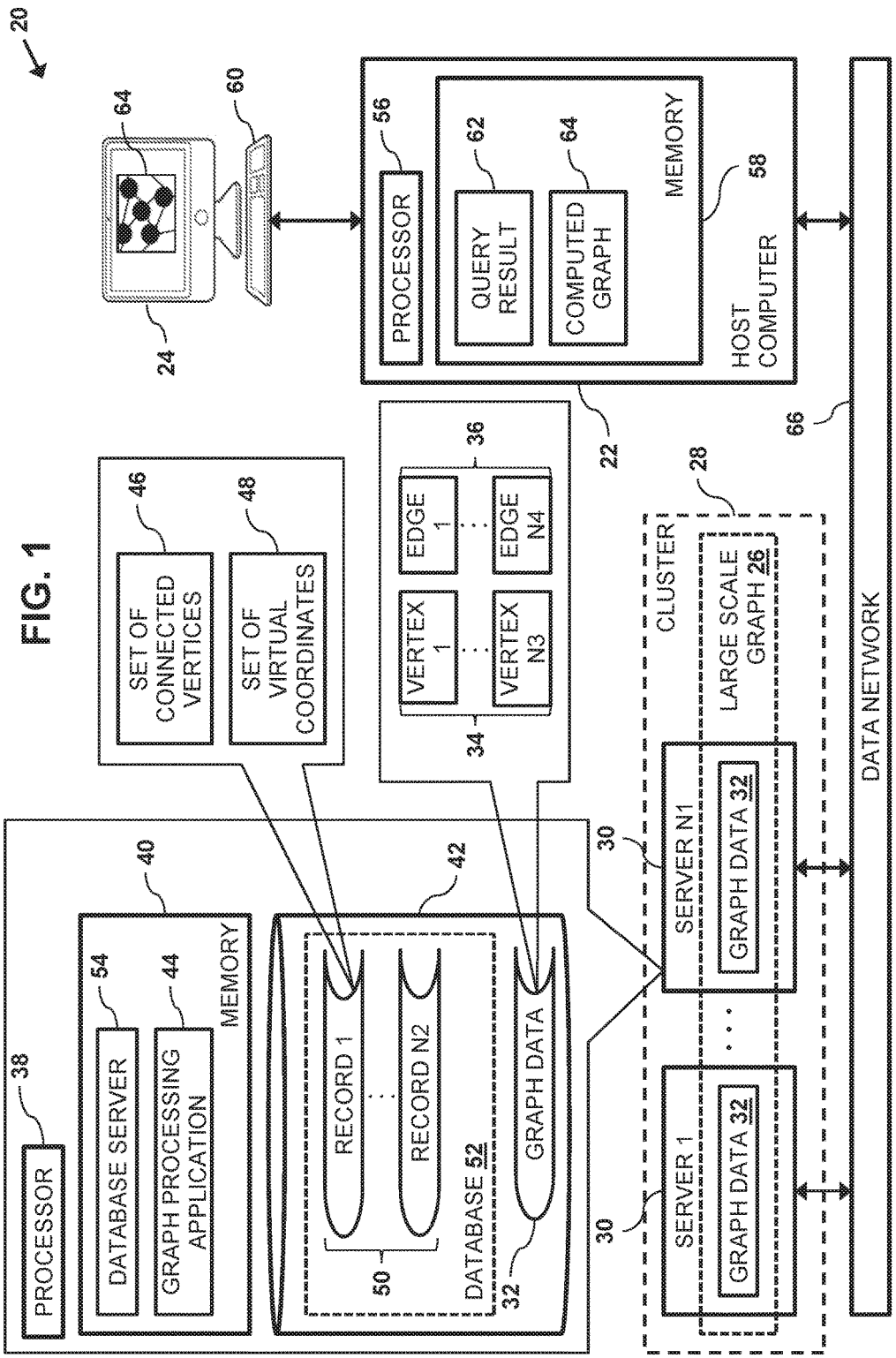
FIG. 1 is a block diagram that schematically illustrates a computing facility configured to analyze and interactively present large scale graphs, in accordance with an embodiment of the present invention.

FIG. 1 is a block diagram that schematically illustrates a data facility 20 comprising a host computer 22 that can interactively present, on a display 24, a large scale graph 26 stored on a cluster 28 of server computers 30. In other words, graph data 32 comprising vertices 34 and edges 36 is typically too large to store on any single server computer 30, and is therefore distributed among the server computers. Server computers 30 and host computer 22 communicate via a data network 66 such as a local area network or a wide area network (e.g., the Internet).

Each server 30 comprises a server processor 38, a server memory 40 and one or more storage devices 42 such as hard disk drives or solid-state disk drives. Each storage device 42 stores a subset of graph 26 in a respective instance of graph data 32. In operation, the server processor on each given server computer 30 executes, from memory 40, a graph processing application 44 (i.e., a distributed application executing on all the server computers) that identifies, for each given vertex 34 on the given server computer, a set 46 of vertices 34 that are directly connected to the given vertex by a given edge 36, and computes, for each given vertex 34 on the given server computer, a vertex value indicating a set of virtual coordinates 48 (e.g., x/y coordinates on a virtual plane) for the given vertex. Graph distributed application 44 may be based, for example, on the Pregel™ framework, produced by Alphabet Inc. (Mountain View, Calif.).

Upon computing virtual coordinates 48, each set of virtual coordinates 48 and set of connected vertices 46 (i.e., the set of vertices directly connected to the given vertex) are stored to a respective record 50 in a database 52 managed by a database server application 54 stored in memory 40 and executing on processor 38. Database server application 54 typically comprises a distributed software application that executes on server computers 30 and manages database 52 whose records are likewise distributed across the server computers in cluster 28.

In addition to display 24, host computer 22 comprises a host processor 56, a host memory 58, and an input device such as keyboard 60. In operation, as explained hereinbelow, processor 56 requests, from database server application 54, a range indicating a subset of vertices 34, receives a plurality of records 50 in response to the request, and stores the received records to a query result 56 in memory 58. Based on a subset of the vertices and the edges indicated by the query result, processor 56 generates a computed graph 64, and presents the computed graph on display 24.

Processors 38 and 56 comprise general-purpose central processing units (CPU) or special-purpose embedded processors, which are programmed in software or firmware to carry out the functions described herein. The software may be downloaded to server computers 30 and host computers 22 in electronic form, over a network, for example, or it may be provided on non-transitory tangible media, such as optical, magnetic or electronic memory media. Alternatively, some or all of the functions of processors 38 and 56 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Processing and Presenting Large Scale Graphs

Figure 2:
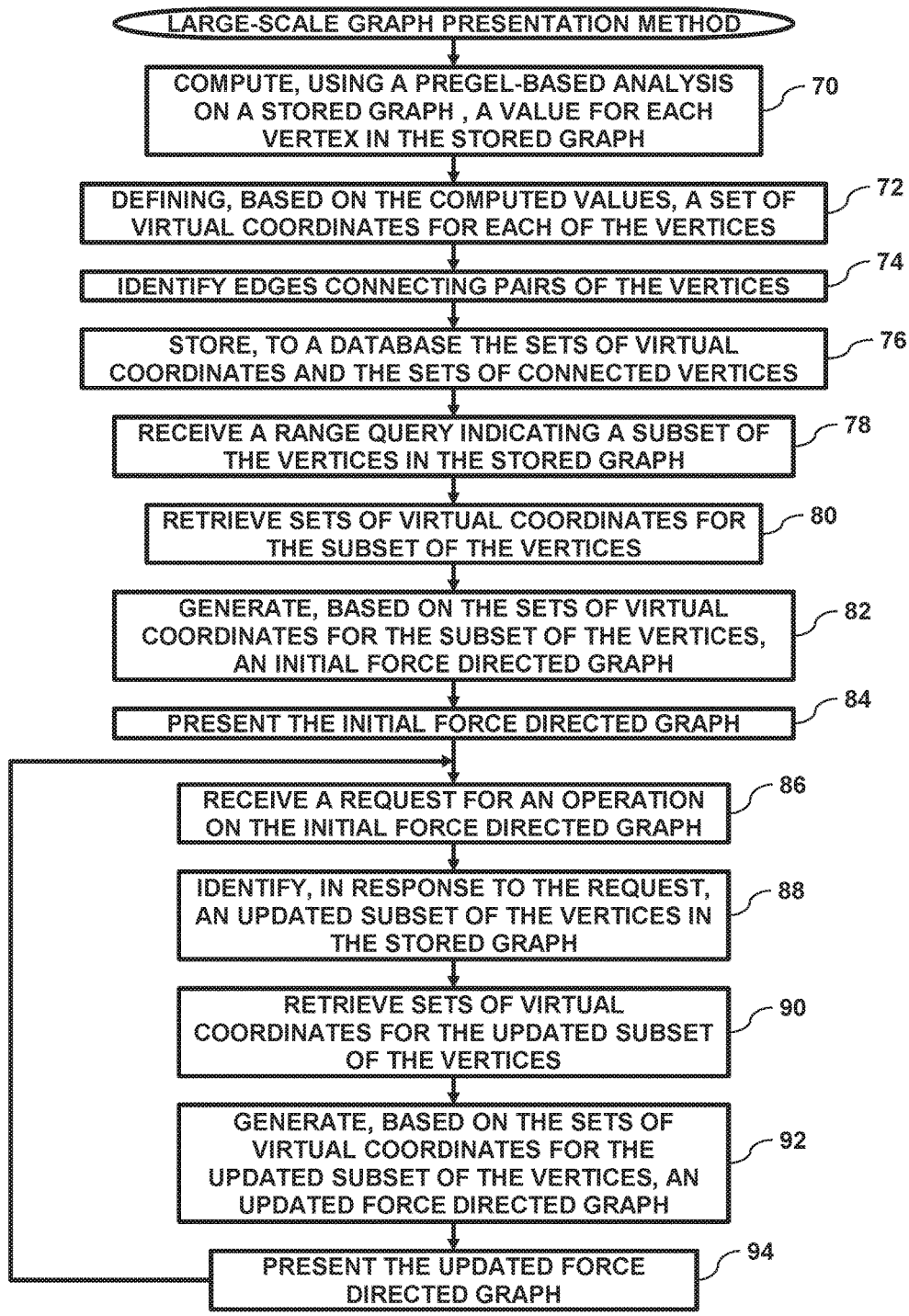
FIG. 2 is a flow diagram that schematically illustrates a method of interactively presenting a large scale graph, in accordance with an embodiment of the preset invention.

FIG. 2 is a flow diagram that schematically illustrates a method of interactively presenting computed graph 64 comprising a subset of large scale graph 26, in accordance with an embodiment of the present invention. In a computation step 70, distributed graph processing application 44 computes a vertex value for each vertex 34 in large scale graph 26 that is distributed on server computers 30, and in a definition step 72, the distributed graph processing application defines, based on the vertex values, a set of virtual coordinates for each of the vertices.

To calculate vertex values indicating respective sets of virtual coordinates 48 vertices 34, distributed graph processing application 44 can compute initial sets of virtual coordinates 48 that are used to determine vertex values for other vertices 34. Distributed graph processing application 44 can then perform an iterative process which eventually converges on final vertex values (and therefore final sets of virtual coordinates 48) for each vertex 34. In some embodiments, the iterative process may comprise the following steps:

i. For each given vertex 34 at iteration "i+1", the given vertex receives messages from all other vertices 34 that (a) are in a same region as the given vertex, and (b) are directly connected to the given vertex via a given edge 36.

ii. The given vertex calculates a "force" applied on it by analyzing the received messages and then by applying Hooke's law when one or more edges 36 are present and Coulomb's law when no edge 36 is present. This simulates repulsive forces between two electrons balanced with the attraction forces applied by the springs.

iii. To calculate a new set of virtual coordinates 48 for each vertex 34 at each iteration, a time delta can be used according to a=F/m=F (m is set to 1 here) and $l\_\{i+1\}=l\_\{i\}+0.5*at_2$, wherein "l" comprises the new set of virtual coordinates, "i" comprises the current iteration, and "t" comprises a time-delta. Time-delta (t) is typically initially (i.e., at startup) set to a high value and reduced in each subsequent iteration in order to allow quick convergence.

iv. Finally, friction can be added so that the "system loses energy" in order to avoid any oscillation of the vertices.

In an identification step 74, distributed graph processing application 44 identifies edges 36 connecting pairs of vertices 34, and in a store step 76, the distributed graph processing application stores, to a given record 50 for each given vertex 34, a (final) given set of virtual coordinates 48 and a given set 46 indicating one or more additional vertices 34 connected to the given vertex by one or more respective edges 34. The final sets of virtual coordinates 48 indicate final "virtual locations" for each of the vertices. Distances between the virtual locations of the vertices are typically inversely proportional to weights of the edges, wherein the weights can be used to represent various relationships (e.g., similarity, proximity etc.) between the vertices modeled in graph 26.

Figure 3:
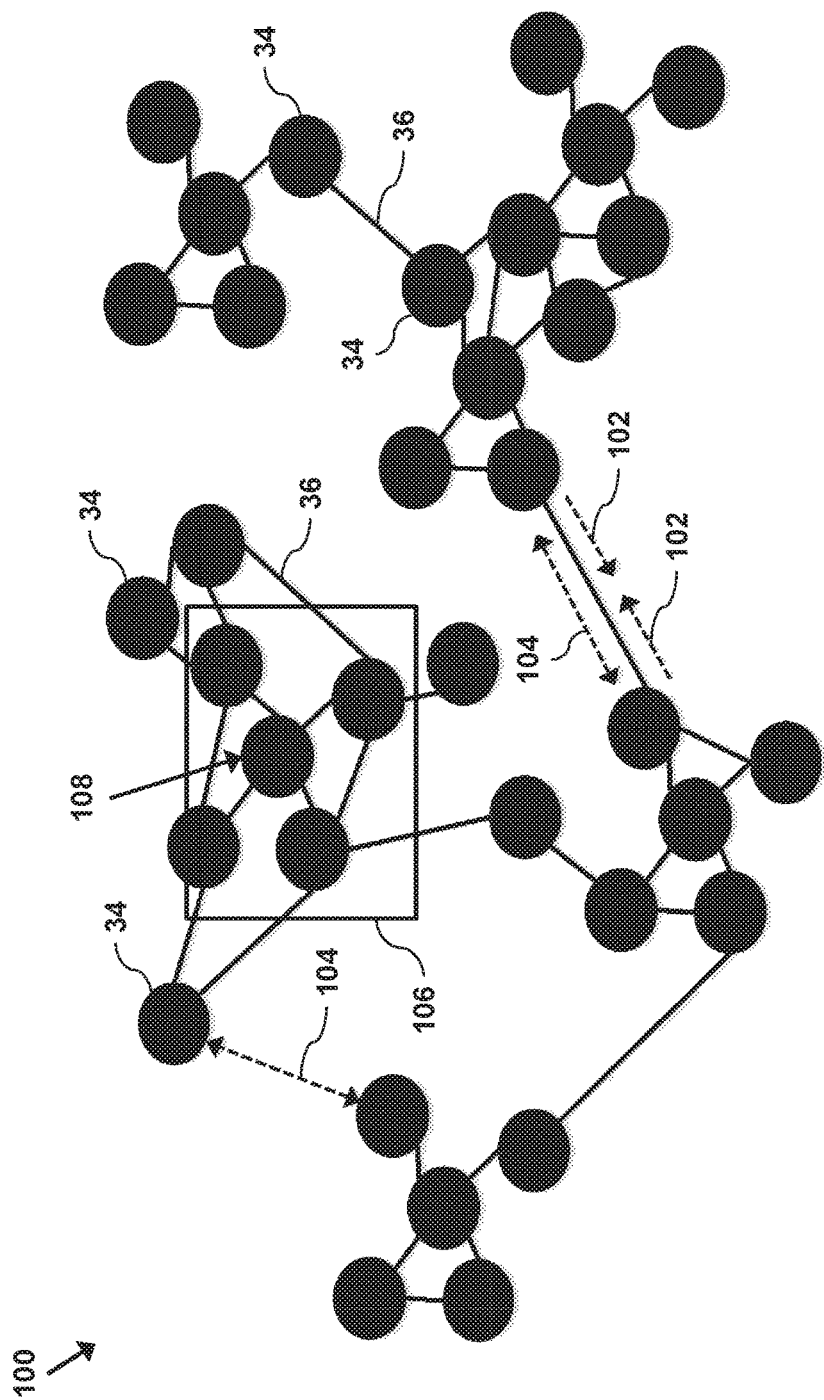
FIG. 3 is an example of the large scale graph that can be presented, in accordance with an embodiment of the preset invention.

FIG. 3 is a force directed graph 100 comprising vertices 34 presented at their respective virtual coordinates 48, in accordance with an embodiment of the present invention. In directed graph 100, the virtual coordinates can be calculated as a result of attraction forces 102 (based on a variation of Hooke's Law) between each pair of vertices 34 that are connected by a given edge 36, and repulsive forces 104 between each pair of the vertices. In the force directed graph paradigm, distributed graph processing application 44 can model vertices 34 as electrons and model edges 36 as springs.

Returning to the flow diagram, in a first receive step 78, distributed graph processing application 44 receives, from host computer 22, a range query indicating a subset of vertices 34, and in a first retrieval step 80, the distributed graph processing application retrieves, via database server application 54, records 50 for the requested subset of the vertices. Distributed graph processing application 44 conveys the retrieved records to host computer 22, and upon receiving query result 62 comprising the conveyed records, processor 56 uses the received sets of virtual coordinates 48 and the received sets of connected vertices generates an initial computed graph in a first generation step 82.

In a first presentation step 84, processor 56 presents initial computed graph 64. In the example shown in FIG. 5, the initial computed graph comprises a range of nodes 34 (and their respective vertices 36) presented within a rectangle 106 having a given vertex 34 as point of interest represented by an arrow 106.

In some embodiments, a user analyzing graph 26 on host computer 22 may wish to use initial computed graph 64 as a starting point when analyzing large scale graph 26. For example, the user may want to perform operations such as:

Zoom-in/zoom-out. Zoom operations change the size of screen rectangle 106. For example in a zoom-out operations, vertices 34 and/or edges 36 that are no longer in rectangle 106 can easily be removed by a user interface (not shown) executing on processor 56 and additional vertices 34 and/or edges 34 (as defined by an updated rectangle 106) are retrieved from database 52 as they fall in the "buffer rectangles" that are added to the previous version of the screen rectangle.

Scrolling. The user can scroll left/right/up/down thus removing vertices 34 and/or edges 36 that are "pushed" out of the focus of screen rectangle 106, and retrieve, from database 52, additional vertices 34 and/or edges 36 that fall in a new rectangle delta.

Search. The user can arbitrary focus on different vertices 34 in graph 26 by focusing screen rectangle 106 on the focused vertices.

In a second receive step 86, distributed graph processing application 44 receives, from host computer 22, a request for an operation on a current computed graph 64 presented on display 24. As described supra, a user of host computer 22 may request (e.g., via input on keyboard 60) an operation such as zooming in/out, panning up/down/left/right, or a search query.

In response the request for the operation, distributed graph processing application 44 identifies, in a second identification step 88, an updated subset of the vertices, and retrieves, in a second retrieval step 90, records 50 for the updated subset of the vertices. Distributed graph processing application 44 conveys the updated records to host computer 22, and upon receiving query result 62 comprising the updated records, processor 56 uses the received sets of virtual coordinates 48 and the received sets of connected vertices generates an updated computed graph in a second generation step 92. Finally, in a second presentation step 94, processor 56 presents updated computed graph 64, and the method continues with step 86.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

storing, by a cluster comprising multiple server computers, a graph comprising vertices and edges distributed among the server computers;

assigning, to each given vertex, an initial set of virtual coordinates indicating a virtual location of the given vertex;

repeating for a plurality of iterations:

for each vertex i of the vertices of the graph, calculating a force on the vertex, from vertices having respective virtual locations in a vicinity of the vertex i and from vertices connected to vertex i by edges, wherein each neighboring vertex in the vicinity of the vertex i applies a repulsive force on the vertex i and each vertex connected to vertex i applies on vertex i an attraction force, and adjusting the set of virtual coordinates of each of the vertices according to the calculated force on the vertex;

storing, to a database, the respective set of virtual coordinates for each of the vertices after the plurality of iterations converge;

receiving, from a host computer, a request indicating a subset of the vertices;

retrieving, from the database, the respective sets of virtual coordinates for the requested subset of the vertices;

conveying, to the host computer, the retrieved sets of virtual coordinates; and presenting representations of the vertices on a display of the host computer in a layout arranged responsive to the retrieved sets of virtual coordinates.

2. The method according to claim 1, wherein the sets of virtual coordinates indicate a force directed graph having the attraction forces between each pair of the vertices connected by a given edge, and the repulsive forces between each pair of the vertices.

3. The method according to claim 1, wherein the graph comprises a first graph, wherein the vertices comprise first vertices, wherein the subset of the vertices comprises second vertices, wherein the edges comprise first edges, and comprising receiving, by the host computer, the retrieved sets of virtual coordinates, generating a second graph comprising the subset of the vertices and second edges that connect pairs of the second vertices, and presenting the second graph on a display.

4. The method according to claim 3, wherein the sets of virtual coordinates comprise first sets of virtual coordinates, and further comprising: receiving, by the cluster from the host computer, an additional request comprising an operation on the second graph, identifying, in response to the requested operation, an updated subset of the first vertices, retrieving, from the database, respective second sets of virtual coordinates for the updated subset, conveying, to the host computer, the retrieved second sets of virtual coordinates, receiving, by the host computer, the retrieved second sets of virtual coordinates, generating a third graph comprising the updated subset of the vertices and third edges that connect pairs of the updated subset of the vertices, and presenting the third graph on the display.

5. The method according to claim 4, wherein the operation is selected from a group consisting of a zoom-in operation, a zoom-out operation, a scrolling operation, and a search operation.

6. The method according to claim 1, wherein computing the vertex values comprises executing a graph processing system distributed among the server computers.

7. The method according to claim 6, wherein the graph processing system comprises a Pregel-based platform.

8. The method according to claim 1, wherein adjusting the set of virtual coordinates of each of the vertices according to the calculated force on the vertex comprises applying respective friction forces to the calculated forces of the vertices during the plurality of the iterations.

9. The method according to claim 1, wherein adjusting the coordinate of each vertex comprises selecting a magnitude of the adjustment as a product of the force and a time-delta value which decreases between iterations.

10. A computing facility, comprising:
a host computer comprising a display; and
a cluster comprising multiple server computers having a respective storage capacity within a range of storage capacities between a first storage capacity and a second storage capacity greater than the first storage capacity and configured:
to store a graph comprising vertices and edges distributed among the server computers
to assign, to each given vertex, an initial set of virtual coordinates indicating a virtual location of the given vertex,
to repeat for a plurality of iterations:
for each vertex i of the vertices of the graph, calculating a force on the vertex, from vertices having respective virtual locations in a vicinity of the vertex i and from vertices connected to vertex i by edges, wherein each neighboring vertex in the vicinity of the vertex i applies a repulsive force on the vertex i and each vertex connected to vertex i applies on vertex i an attraction force, and
adjusting the set of coordinates of each of the vertices according to the calculated force on the vertex,
to store, to a database, the respective set of virtual coordinates for each of the vertices after the plurality of iterations converge,
to receive, from a host computer, a request indicating a subset of the vertices,
to retrieve, from the database, the respective sets of virtual coordinates for the requested subset of the vertices,
to convey, to the host computer, the retrieved sets of virtual coordinates, and
to present, on the display, representations of the vertices on a display of the host computer in a layout arranged responsive to the retrieved sets of virtual coordinates.

11. The computing facility according to claim 10, wherein the sets of virtual coordinates indicate a force directed graph having the attraction forces between each pair of the vertices connected by a given edge, and the repulsive forces between each pair of the vertices.

12. The computing facility according to claim 10, wherein the graph comprises a first graph, wherein the vertices comprise first vertices, wherein the subset of the vertices comprises second vertices, wherein the edges comprise first edges, and wherein the host computer is configured to receive the retrieved sets of virtual coordinates, to generate a second graph comprising the subset of the vertices and second edges that connect pairs of the second vertices, and to present the second graph on the display.

13. The computing facility according to claim 12, wherein the sets of virtual coordinates comprise first sets of virtual coordinates, wherein the cluster is further configured: to receive, from the host computer, an additional request comprising an operation on the second graph, to identify, in response to the requested operation, an updated subset of the first vertices, to retrieve, from the database, respective second sets of virtual coordinates for the updated subset, and to convey, to the host computer, the retrieved second sets of virtual coordinates, and wherein the host computer is further configured to receive the retrieved second sets of virtual coordinates, to generate a third graph comprising the updated subset of the vertices and third edges that connect pairs of the updated subset of the vertices, and to present the third graph on the display.

14. The computing facility according to claim 13, wherein the operation is selected from a group consisting of a zoom-in operation, a zoom-out operation, a scrolling operation, and a search operation.

15. The computing facility according to claim 10, wherein the cluster is configured to compute the vertex values by executing a graph processing system distributed among the server computers.

16. The computing facility according to claim 15, wherein the graph processing system comprises a Pregel-based platform.

17. A computer program product, the computer program product comprising:
a non-transitory computer readable storage medium having computer readable program code embodied therewith, the computer readable program code comprising:
computer readable program code configured to store, on a cluster comprising multiple server computers, a graph comprising vertices and edges distributed among the server computers;
computer readable program code configured to assign, to each given vertex, an initial set of virtual coordinates indicating a virtual location of the given vertex;
computer readable program code configured to repeating for a plurality of iterations:
for each vertex i of the vertices of the graph, calculating a force on the vertex, from vertices having respective virtual locations in a vicinity of the vertex i and from vertices connected to vertex i by edges, wherein each neighboring vertex in the vicinity of the vertex i applies a repulsive force on the vertex i and each vertex connected to vertex i applies on vertex i an attraction force; and
adjusting the set of virtual coordinates of each of the vertices according to the calculated force on the vertex;
computer readable program code configured to store, to a database, the respective set of virtual coordinates for each of the vertices after the plurality of iterations converge;
computer readable program code configured to receive, from a host computer, a request indicating a subset of the vertices;
computer readable program code configured to retrieve, from the database, the respective sets of virtual coordinates for the requested subset of the vertices;
computer readable program code configured to convey, to the host computer, the retrieved sets of virtual coordinates; and
computer readable program code configured to present representations of the vertices on a display of the host computer in a layout arranged responsive to the retrieved sets of virtual coordinates.

18. The computer program product according to claim 17, wherein the sets of virtual coordinates indicate a force directed graph having the attraction forces between each pair of the vertices connected by a given edge, and the repulsive forces between each pair of the vertices.

19. The computer program product according to claim 17, wherein the graph comprises a first graph, wherein the vertices comprise first vertices, wherein the subset of the vertices comprises second vertices, wherein the edges comprise first edges, and comprising computer readable program code configured to receive, by the host computer, the retrieved sets of virtual coordinates, to generate a second graph comprising the subset of the vertices and second edges that connect pairs of the second vertices, and to present the second graph on a display.

20. The computer program product according to claim 19, wherein the sets of virtual coordinates comprise first sets of virtual coordinates, and further comprising: computer readable program code configured to receive, by the cluster from the host computer, an additional request comprising an operation on the second graph, to identify, in response to the requested operation, an updated subset of the first vertices, to retrieve, from the database, respective second sets of virtual coordinates for the updated subset, to convey, to the host computer, the retrieved second sets of virtual coordinates, to receive, by the host computer, the retrieved second sets of virtual coordinates, to generate a third graph comprising the updated subset of the vertices and third edges that connect pairs of the updated subset of the vertices, and to present the third graph on the display.

21. The computer program product according to claim 20, wherein the operation is selected from a group consisting of a zoom-in operation, a zoom-out operation, a scrolling operation, and a search operation.

22. The computer program product according to claim 17, wherein the computer readable program code configured to compute the vertex values comprises a graph processing system distributed among the server computers.

* * * * *